United States Patent [19]

Harloff et al.

[11] Patent Number: 4,969,727
[45] Date of Patent: Nov. 13, 1990

[54] OUTSIDE MIRROR FOR A VEHICLE

[75] Inventors: Bernd Harloff, Boblingen; Dieter Eckert, Magstadt; Siegfried Herzog, Steinebronn; Robert Schwed, Stuttgart, all of Fed. Rep. of Germany

[73] Assignee: Daimler-Benz Aktiengesellschaft, Stuttgart, Fed. Rep. of Germany

[21] Appl. No.: 363,149

[22] Filed: Jun. 8, 1989

[30] Foreign Application Priority Data

Jun. 8, 1988 [DE] Fed. Rep. of Germany ....... 3819471

[51] Int. Cl.⁵ ............................ B60R 1/06; G02B 5/08
[52] U.S. Cl. .................................... 350/637; 350/604; 248/479; 248/549; 248/900
[58] Field of Search ............... 350/604, 632, 634, 637, 350/605, 606; 248/549, 479, 900

[56] References Cited

U.S. PATENT DOCUMENTS

| | | | |
|---|---|---|---|
| 4,836,490 | 6/1989 | Mittelhauser et al. | 248/549 |
| 4,840,475 | 6/1989 | Herzog et al. | 248/900 |

FOREIGN PATENT DOCUMENTS

| | | | |
|---|---|---|---|
| 0287181 | 10/1988 | European Pat. Off. | 350/637 |
| 0092131 | 5/1985 | Japan | 350/604 |
| 0001551 | 1/1986 | Japan | 350/632 |
| 0071244 | 4/1986 | Japan | 350/632 |
| 0001653 | 1/1987 | Japan | 350/637 |

*Primary Examiner*—Bruce Y. Arnold
*Assistant Examiner*—R. D. Shafer
*Attorney, Agent, or Firm*—Evenson, Wands, Edwards, Lenahan and McKeown

[57] ABSTRACT

An outside mirror for motor vehicles employs an electromotive drive to position a mirror housing between a viewing position and garage position. The mirror housing is moved in a direction opposite to the direction of travel against the vehicle body to position the housing at the garage position however, a mobility of the mirror housing in the event of collisions in both directions is provided so that the mirror housing automatically returning to the viewing position in the case of movements in the direction of travel.

4 Claims, 3 Drawing Sheets

OUTSIDE MIRROR FOR A VEHICLE

BACKGROUND AND SUMMARY OF THE INVENTION

The present invention generally relates to a yieldable motor vehicle outside mirror and more particularly to a yieldable mirror which can be moved between an operating position and a garage position against a side of a vehicle.

In the case of an outside mirror as disclosed by German Patent Specification 3,613,878, two swivel axes are positioned virtually parallel to an outside surface of the vehicle to permit the mirror housing to yield forwards and backwards in the event of a collision in the manner of a swing door. In this arrangement, the rear swivel axis, in the direction of travel, is located immoveably with respect to the mirror base and the front swivel axis is located immoveably with respect to the mirror housing The mirror base itself is provided with an aerodynamic casing A disadvantage with the above-noted outside mirror construction is that, when it is desirable to pivot the mirror housing in a horizontal plane in the direction opposite to the forward direction of travel of the vehicle until it contacts the vehicle body (garage position), it returns to the initial position (operating position), and does not stay in the garage position of its own accord due to the restoring force of the spring.

Accordingly, an object of the present invention is to provide a yieldable outside mirror of simple construction capable of maintaining a garage position of the mirror housing yet in the operating position the mirror housing can still yield forwards and backwards in the event of a collision.

Advantages which can be achieved by preferred embodiments of the present invention are that the mirror housing can be swivelled into the garage position and stays readily in this position, allowing, for example, driving through a narrow space to thereby reduce the risk of a collision by the reduced width of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
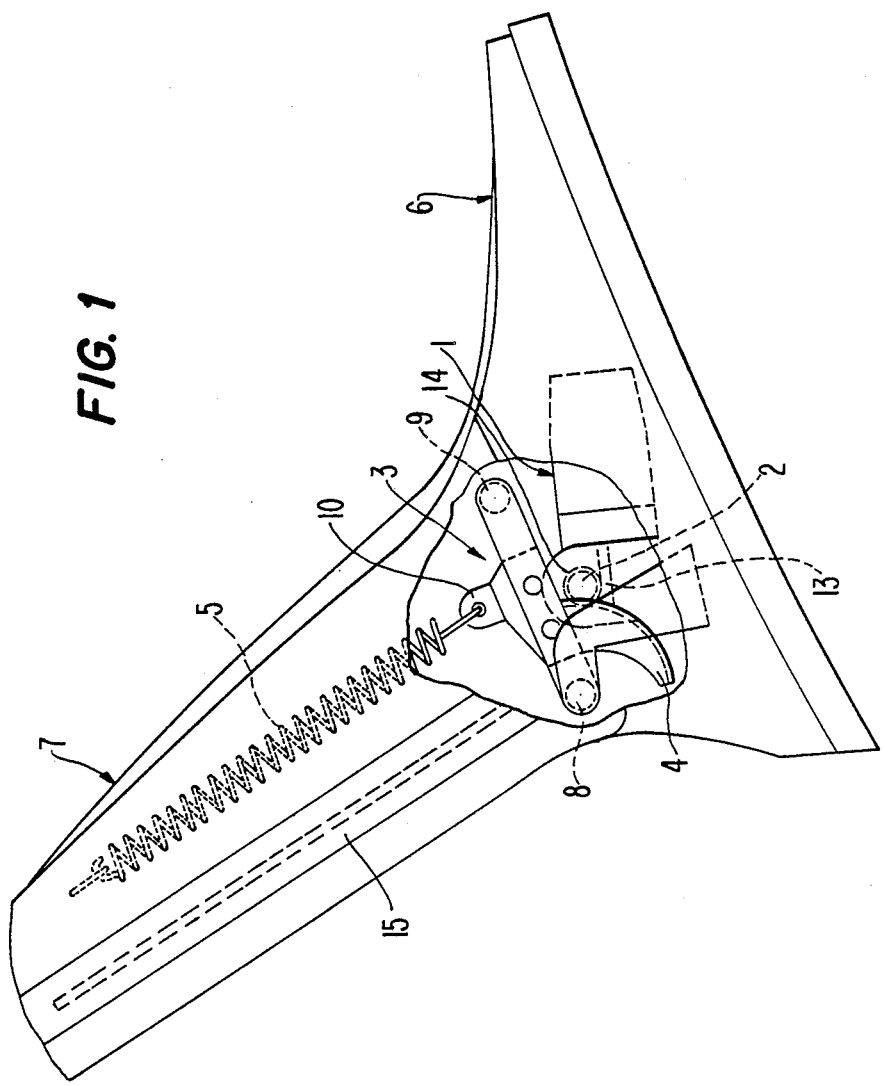
FIG. 1 shows a plan view of an outside mirror in accordance with an exemplary embodiment of the present invention.

The outside mirror shown in the Figures comprises a mirror housing 7, in which a mirror glass 15 is adjustably held. The mirror housing 7 is firmly connected via the swivel axes 8, 9 and the coupling element 3 to the mirror base 6, the swivel axis 8 being fitted firmly at the mirror base 6 and the swivel axis 9 being fitted firmly at the mirror housing 7. The mirror base 6 is expediently fitted on the outside surface of the vehicle body.

In the mirror base 6 there is an electromotive drive 1 with drive pinion 2, there being a slip clutch between a worm gear 13 and the drive pinion 2.

The teeth of the drive pinion 2 engage in the teeth of the gear wheel segment 4, which in turn is part of the coupling element 3. The gear wheel segment 4 is shaped such that its teeth are concentrically located with respect to the swivel axis 8.

The coupling element 3 connects the two swivel axes 8 and 9 and, furthermore, the helical tension spring 5 is attached at 10 onto the coupling element 3, for example, by a hook or the like. The other end of the helical tension spring 5 is hooked onto the mirror housing 7.

The operating principle is described below.

Figure 2:
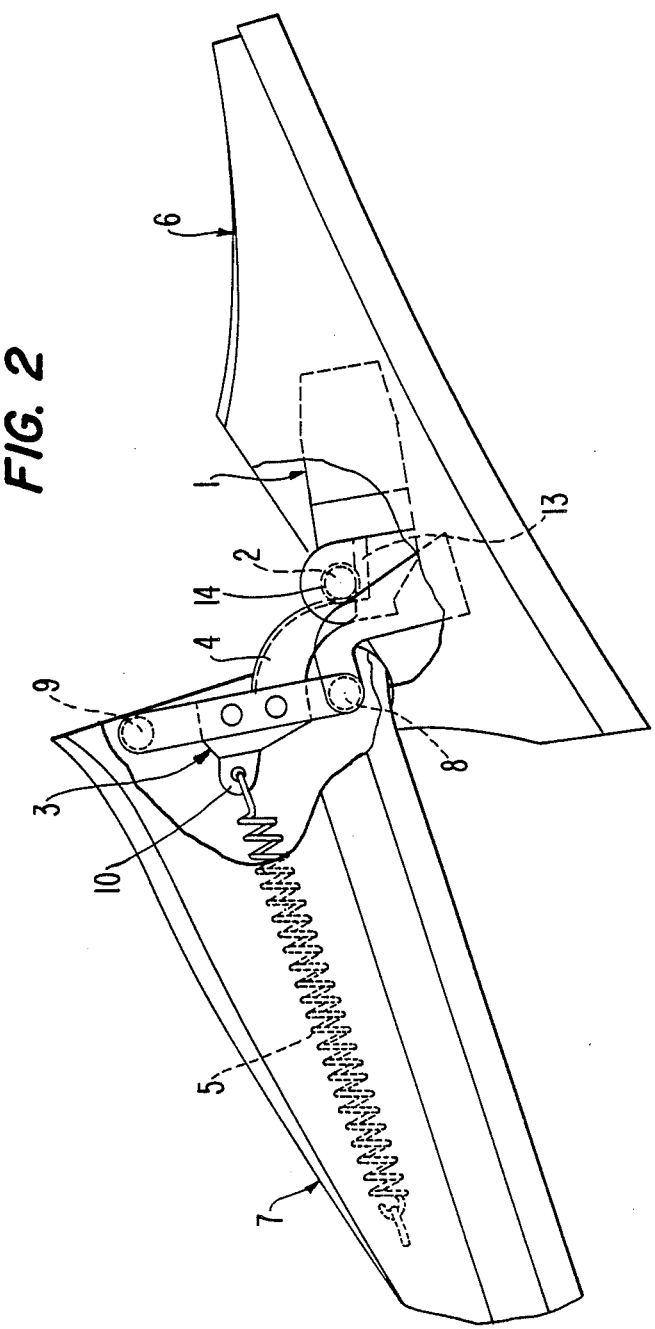
FIG. 2 shows a plan view of the outside mirror of FIG. 1, the mirror housing having been swung into a garage position in a direction opposing the direction of travel of the vehicle.

If the mirror housing 7 is to be moved from the operating position as shown in FIG. 1 into the garage position as shown in FIG. 2, the electromotive drive 1 is actuated. In so doing, the mirror housing 7 is then moved via the drive pinion 2 and the gear wheel segment 4 about the swivel axis 8. Due to the fact that the helical tension spring 5 is hooked with its outer end to the mirror housing 7 and with its other end to the coupling element 3, the spring 5 is not stretched during this movement. Therefore, it does not effect any restoring rotational moment of the mirror housing 7 with respect to the swivel axis 8 once the mirror housing 7 is positioned in the garage position as shown in FIG. 2, i.e. this movement takes place free from any forces with respect to the helical tension spring 5.

Since, in the event of a collision, the mirror housing 7 must yield automatically in the direction of travel as well as in the opposite direction, a slip clutch 14 between the worm gear 13 and the drive pinion 2 is provided. This has the effect that, if a defined force or moment acts on the mirror housing 7, the movement of the mirror housing 7 between operating position of FIG. 1 and garage position of FIG. 2 about the swivel axis 8 is possible without actuation of the electromotive drive. The return movement of the mirror housing 7 into the operating position is then performed by the electromotive drive.

Figure 3:
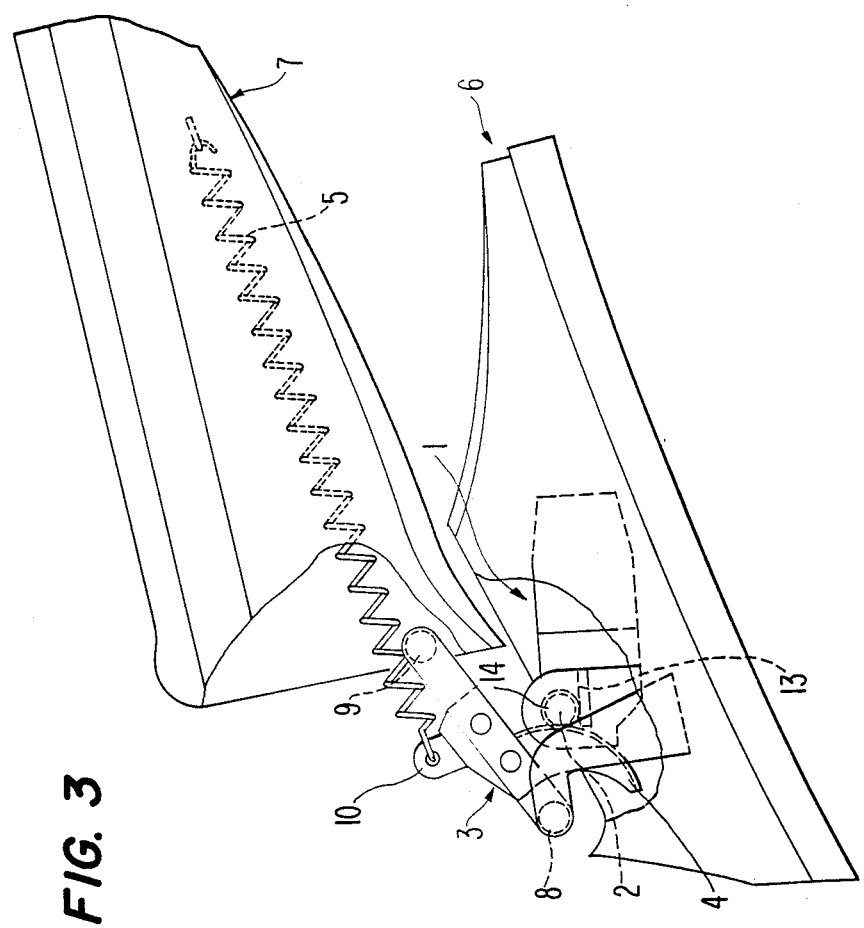
FIG. 3 shows a further plan view of the outside mirror, the mirror housing having been swung forwards in the direction of travel because of a collision.

If a force or moment acts on the mirror housing 7 in the direction of travel, a pivoting of the mirror housing 7 takes place about the front swivel axis 9 as shown in FIG. 3. The helical spring 5 is subjected to tension during such movement since the coupling element 3 moves only slightly out of its original position. Since the helical tension spring 5 then has a rotational moment other than zero with respect to the swivel axis 9, the mirror housing 7 swings back again virtually into its initial position after it has been subjected to the external force. During this process, due to the virtually unchanged position of the coupling element 3, the position between drive pinion 2 and gear wheel segment 4 does in fact alter slightly, but this remaining displacement can easily be restored electromotively.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Outside mirror for a vehicle comprising:
   a mirror housing for adjustably holding a mirror glass;

a mirror base for holding the mirror housing and immoveably located with respect to the vehicle;

two swivel axes means spaced from one another and lying in a plane approximately parallel to an outside side surface of the vehicle, for permitting a yielding of the mirror housing in the event of a collision in either a forward or backward direction, a front swivel axis of the two swivel axes means, as seen in a forward direction of travel of the vehicle, being fixed with respect to the mirror housing and a rear swivel axis of the two swivel axis means, as seen in the forward direction of travel, being fixed with respect to the mirror base;

coupling means for rigidly connecting the two swivel axes means;

tensioning means for tensioning the mirror housing into an operating position;

a gear wheel segment means fitted on the coupling means concentrically to the rear swivel axis; and drive pinion means of an electromotive drive for engaging teeth of the gear wheel segment means for positioning the outside mirror against a vehicle body in a direction opposing the forward direction of travel of the vehicle.

2. Outside mirror of a vehicle according to claim 1, wherein the electromotive drive comprises a motor for driving a worm gear arranged to engage the drive pinion at a drive end of the worm gear.

3. Outside mirror of a vehicle according to claim 2, wherein a slip clutch is provided between the drive pinion and the worm gear.

4. Outside mirror for a vehicle according to claim 1, wherein the tensioning means is a helical spring extending substantially transversely to the two swivel axes and attached at one end at a housing side to the mirror housing and at another end to the coupling element.

* * * * *